United States Patent

[11] 3,610,925

| [72] | Inventors | Richard E. Brelin<br>Mount Clemens;<br>Lawrence F. Wooden, Detroit, both of Mich. |
|---|---|---|
| [21] | Appl. No. | 866,474 |
| [22] | Filed | Oct. 15, 1969 |
| [45] | Patented | Oct. 5, 1971 |
| [73] | Assignee | The Detroit Edison Company<br>Detroit, Mich. |

[54] APPARATUS FOR COMPUTING CONVEYOR BELT MASS FLOW RATE INCLUDING A RADIOACTIVE SOURCE DETECTOR AND SLIDE-WIRE LINEARIZER MULTIPLIER
5 Claims, 4 Drawing Figs.

[52] U.S. Cl. .................................... 250/52,
250/53, 250/83.3 D, 250/106 R
[51] Int. Cl. .................................... G01t 1/16
[50] Field of Search ........................... 250/52,
106, 51.5, 83.3 D

[56] References Cited
UNITED STATES PATENTS

| 3,278,747 | 10/1966 | Ohmart | 250/83.3 D |
| 3,518,425 | 6/1970 | Gruenwald | 250/83.3 D |
| 3,482,098 | 12/1969 | Mangan | 250/83.3 D |

*Primary Examiner*—James W. Lawrence
*Assistant Examiner*—C. E. Church
*Attorney*—Whittemore, Hulbert & Belknap ABSTRACT: Structure for and a method of determining the mass of material moving past a predetermined point on a conveyor belt including a radioactive C-frame through which the conveyor belt passes operable to provide a signal proportional to the density of the material on the belt passing through the C-frame, rotating wheel structure maintained in contact with the conveyor belt for providing a signal proportional to the speed of the conveyor belt as it passes through the C-frame, and structure for linearizing the signal from the C-frame and providing a functional multiplication of the density signal and conveyor belt speed signal to provide an output signal proportional to the mass of material passing through the C-frame. A mass rate indicator and a total mass register provides desired indications of the mass moving on the conveyor belt in response to the output signal proportional to the mass of material.

PATENTED OCT 5 1971 3,610,925

INVENTORS
RICHARD E. BRELIN
LAWRENCE F. WOODEN
BY Whittemore
Hulbert & Belknap
ATTORNEYS INVENTORS
RICHARD E. BRELIN
LAWRENCE F. WOODEN
BY *Whittemore*
*Hulbert & Belknap*
ATTORNEYS

APPARATUS FOR COMPUTING CONVEYOR BELT MASS FLOW RATE INCLUDING A RADIOACTIVE SOURCE DETECTOR AND SLIDE-WIRE LINEARIZER MULTIPLIER

BACKGROUND OF THE INVENTION

1. Field of the Invention

The invention relates to the measurement of the mass of material moving on a conveyor belt past a predetermined point and refers more specifically to structure for and a method of providing a signal representative of the density of coal passing a predetermined point on a moving conveyor belt, providing a signal proportional to the speed of the conveyor belt at the predetermined point, linearizing the density signal and providing a functional multiplication of the density and speed signals to provide a signal proportional to the mass of coal passing the predetermined point on the conveyor belt, and providing a ton-rate indication and a total ton register of the mass of coal passing the predetermined point on the conveyor belt.

2. Description of the Prior Art

In the past, devices for measuring the quantity of material passing a predetermined point on a conveyor belt or the like have taken various forms. Thus, the mass of material having a predetermined cross section passing a predetermined point and moving on a conveyor has been determined by angular displacement of a swinging arm, the material moving on the conveyor has been weighed at the predetermined point, the mass of magnetic material on a conveyor has been determined by the electrical action of the material on annular coils positioned at the predetermined point and the length of the belt passing the predetermined point together with a constant cross section of material have been used to determine the mass of material passing the predetermined point on the belt. Also, the measurement of the radioactivity of a material on a conveyor belt has been used to determine the quantity of material passing a predetermined point on the conveyor belt.

All of the above previously known methods of determining the mass of material passing a predetermined point on a conveyor belt have had undesirable aspects, such as requiring a particular cross section shape of the material on the belt, a constant conveyor belt speed, separate conveyor sections for performing a weight measurement, or requiring the material traveling on the conveyor belt to be magnetic or to contain active radioisotopes or the like. Further, with the previously known methods, the accuracy of measurement of the mass of material passing a predetermined point on a conveyor belt has not been acceptable for many purposes.

SUMMARY OF THE INVENTION

In accordance with the invention, an electric signal proportional to the density of coal passing a predetermined point on a moving conveyor belt is developed through a radioactive C-frame structure, an electric signal proportional to the speed of the conveyor belt past the predetermined point is developed by means of a rotatably mounted wheel held in contact with the conveyor belt, and a functional multiplication of the density and speed signals is accomplished in a slide-wire multiplier including structure for linearizing the density signal. The resulting signal is proportional to the mass of the coal passing the predetermined point on the conveyor belt and is used to provide a ton-rate of coal passing the predetermined point indication and to provide a total ton of coal passing the predetermined point register.

DESCRIPTION OF THE PREFERRED EMBODIMENT

Figure 1:
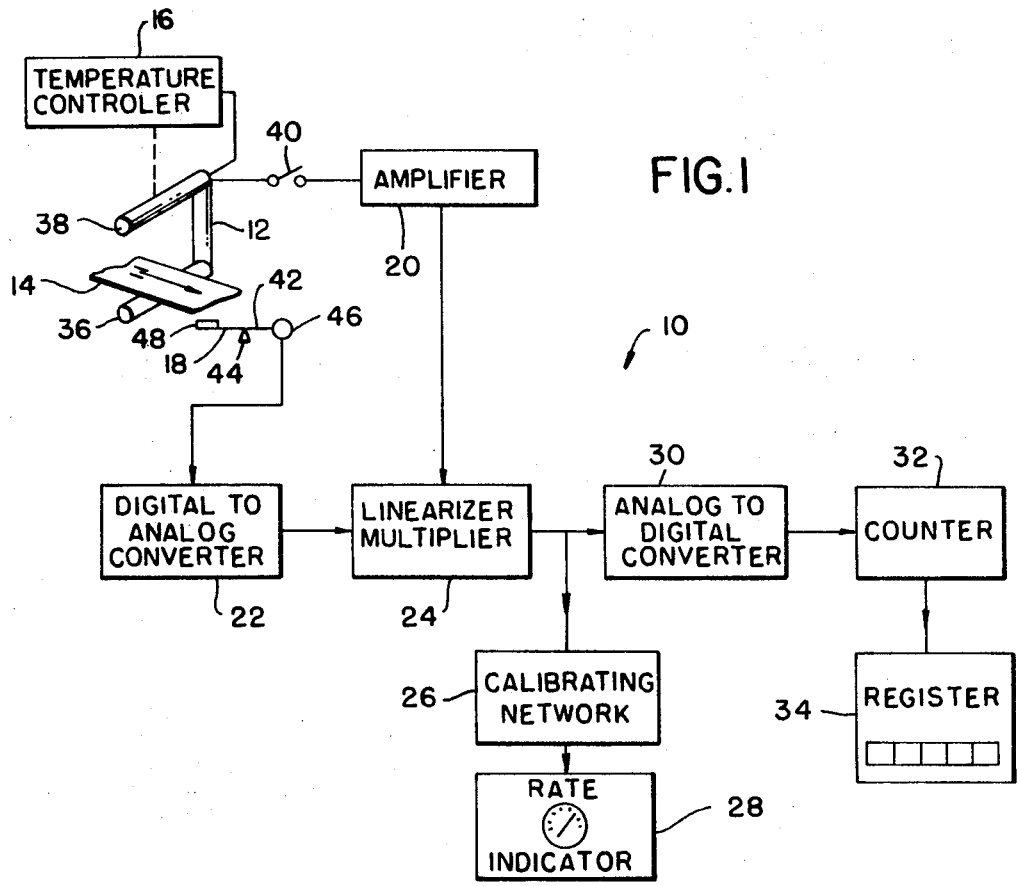
FIG. 1 is a partly schematic, partly block diagram of a mass computation system constructed in accordance with the invention.

As illustrated in FIG. 1, the mass computation system 10 includes radioactive C-frame structure 12 for developing a signal proportional to the density of coal traveling on the conveyor belt 14 past the C-frame 12, temperature controlling structure 16 for the C-frame structure 12 and speed-sensing structure 18 for producing a signal proportional to the conveyor belt 14 through the C-frame structure 12. The mass computation system 10 further includes the amplifier 20 for amplifying the signal from the C-frame structure 12 and the digital-to-analogue converter 22 for providing an analogue signal proportional to the speed of the conveyor 14 from the digital signal produced by the speed sensing structure 18 and the linearizer multiplier 24 for linearizing the output signal of the C-frame structure 12 and functionally multiplying the analogue signals from the amplifier 20 and digital-to-analogue converter 22 to provide an output analogue signal proportional to the mass of material passing the C-frame structure 12.

An analogue-to-digital converter 30 in series with a counter 32 and a total ton register 34 is also provided in the mass computation system 10 to provide an indication on the register 34 of the total ton quantity of coal passing the C-frame structure 12 on the belt 14 from the analogue signal proportional to the mass of coal passing the C-frame structure. As shown in FIG. 1, the calibrating network 26 and ton-rate indicator 28 are in parallel with the analogue-to-digital converter 30, counter 32 and register 34. Both the rate indicator 28 and register 34 may be located remote from the C-frame structure 12 and speed sensing structure 18.

The C-frame structure 12 is a purchased item and may be commercially obtained from the Ohmart Corporation of Cincinnati, Ohio, or from the Nuclear Chicago Company of Chicago, Ill., and will therefore be described only briefly herein.

Radioactive material is contained in the lower leg 36 of the C-frame structure 12 which, as shown in FIG. 1, is positioned below the conveyor belt 14 on which the coal travels. A gas which will ionize to produce an electric signal on exposure to radioactive radiation is placed in the upper leg 38 of the C-frame structure 12. The current produced in the upper leg 38 of the C-frame structure 12 will therefore depend on the amount of radiation received at the upper leg 38 from the radioactive material in the lower leg 36. The quantity of such radiation is determined by the density of the material traveling on the belt 14 between the legs 36 and 38 without regard to the cross section of the material. An electrical signal proportional to the density of coal traveling on the belt 14 at the C-frame structure 12 is thus produced by the C-frame structure.

The temperature controller 16 is provided to maintain the temperature of the C-frame structure 12 at approximately 140° F. so that the output electrical signal from the upper leg 38 of the C-frame structure 12 will not vary with the same density of coal passing the C-frame structure on the belt 14 in accordance with temperature.

The amplifier 20 is provided to amplify the small electric signal from the C-frame structure, which may be in the magnitude of micromicro amps, when the switch 40 is closed to an output signal having a voltage magnitude of a volt or more. Again, such amplifiers are commercially available as, for example, from the above referenced Ohmart Corporation, and will not therefore be considered in detail herein.

Figure 3:
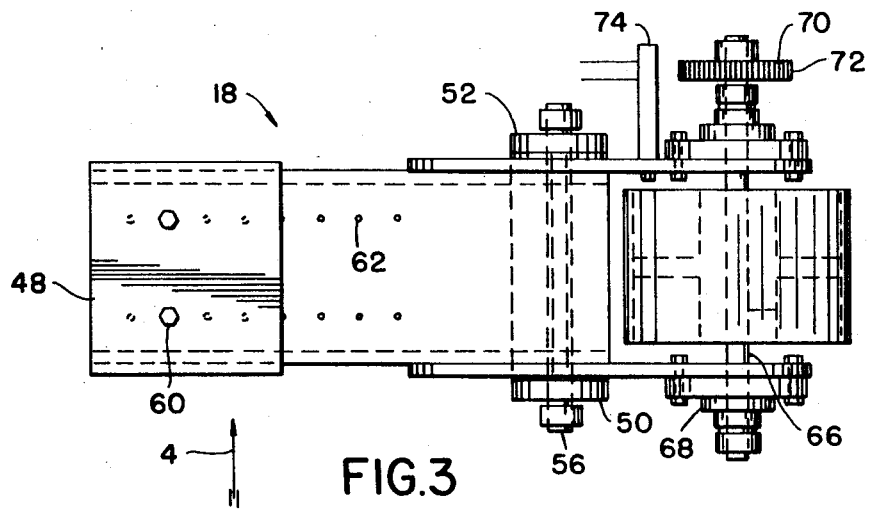
FIG. 3 is a top view of structure for providing a signal proportional to the speed of the conveyor belt of the mass computation system of FIG. 1.
Figure 4:
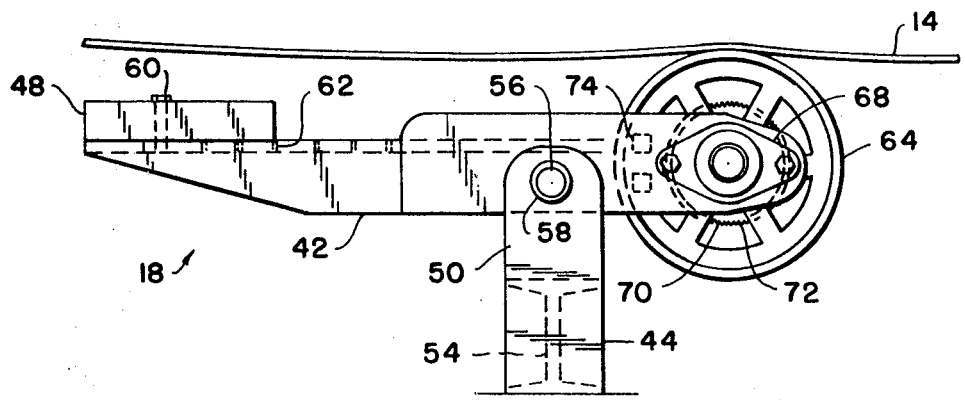
FIG. 4 is an elevation view of the structure illustrated in FIG. 3 taken substantially in the direction of arrow 4 in FIG. 3.

The speed sensing structure 18 includes a lever 42 centrally pivotally mounted on a base 44 beneath the conveyor belt 14, a wheel 46 rotatably secured to one end of the lever 42 and a weight 48 secured to the other end of the lever 42 as illustrated in detail in FIGS. 3 and 4. As shown in FIGS. 3 and 4, the base 44 of the structure 18 includes a pair of vertically extending plates 50 and 52 secured together at the bottom by the I-beam 54. The lever 42 is pivotally supported at the upper ends of the plates 50 and 52 by the pivot pin 56 extending through the lever 42 and journaled in bearings 58 in the plates 50 and 52.

The weight 48 is secured to the lever 42 in an adjusted position longitudinally thereof by bolts 60 extending through holes 62 depending on the desired position of the weight 48 longitudinally of the lever 42. The wheel 64 is secured to the axle 66 for rotation therewith and is rotatably mounted on the lever 42 by means of the bearing structure 68 at the opposite sides of the lever 42.

A disc 70 is also secured to one end of the axle 66 and includes a plurality of separate teeth around the periphery thereof. An electromagnetic pickup device 74 is secured to the lever 42 immediately adjacent the periphery of the disc 70 at one point on the periphery thereof to produce a pulse of electric energy each time a tooth of the disc 72 passes the peripheral point at which the electromagnetic pickup device is positioned.

In operation, the wheel 64 is maintained in contact with the belt 14 as illustrated in FIG. 4 so that the friction between the belt 14 and the wheel 64 produces rotation of the wheel 64 to move the periphery thereof with the belt 14. The pressure at which the wheel is engaged with the belt 14 is determined by the weight 48 and the position on the lever 42 at which it is secured to the lever 42. The digital output signal of the electromagnetic pickup device 74 will therefore have a frequency representing the speed of the belt 14 at the wheel 64 which for practical purposes is at the same point as the C-frame structure 12 relative to the length of the belt 14.

The digital speed signal from speed-sensing structure 18 is converted to an analogue signal proportional to the speed of the belt 14 in the digital-to-analogue converter 22 before it is passed to the linearizer multiplier 24. Since digital-to-analogue converters are common, the digital-to-analogue converter 22 will not be disclosed in detail herein.

Figure 2:
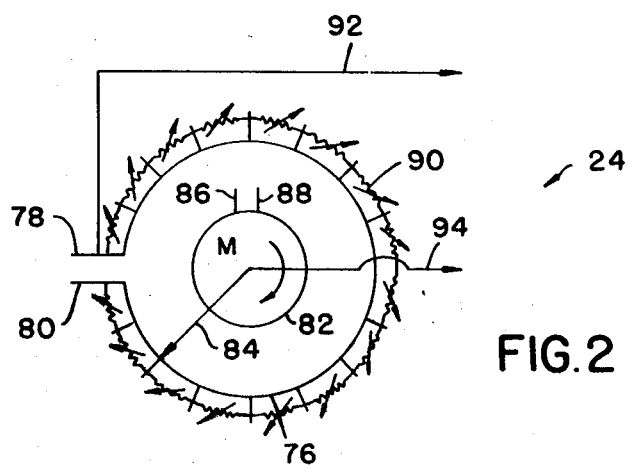
FIG. 2 is a diagrammatic indication of the slide-wire linearizer multiplier of the mass computation system illustrated in FIG. 1.

The linearizer multiplier 24 is more fully shown schematically in FIG. 2 and functions to linearize the analogue signal passed to it from the amplifier 20 to insure that the electrical signal multiplied to provide a signal proportional to the mass of material passing the C-frame structure 12 on the belt 14 accurately represents the density of the material over the range of the linearizer multiplier and to provide a functional multiplication of the analogue signal from the digital-to-analogue converter 22 and the analogue signal from he amplifier 20. The multiplication is functional rather than exact. That is to say, from the linearizer multiplier 24 an output signal is produced which will tend to vary in the same direction on the variance of either the signal from the converter 22 or the amplifier 20 and will actually vary in the direction of the greater of the variances of the signals from the converter 22 and amplifier 20 as presented at the linearizer multiplier 24.

More exactly, the linearizer multiplier 24, as illustrated diagrammatically in FIG. 2, includes a slide wire resistance 76 for receiving the input signal of high side conductor 78 and the low side conductor 80 from the amplifier 20 and motor means 82 for moving a wiper arm 84 clockwise as illustrated in FIG. 2 from the input terminal 78 a distance determined by the signal received by the motor 82 over the conductors 86 and 88 from the converter 22. The slide wire 76 is linearized by the provision of a plurality of variable resistors 90 in parallel with sections thereof as illustrated in FIG. 2.

The resulting output from the linearizer multiplier 24 across the conductors 92 and 94 will be proportional to the total signal from the amplifier 20 in accordance with the position of the wiper arm 84 on the slide wire 76. That is to say, that for any given position of the wiper arm 84 on the slide wire 76, the voltage output of the linearizer multiplier 24 will depend on the magnitude of the voltage from the amplifier 20 with the output being greater when the voltage from the amplifier 20 is greater, and less when the voltage from the amplifier 20 is less.

At the same time, with the same voltage received by the linearizer multiplier 24 from the amplifier 20, the output signal of the linearizer multiplier 24 will vary in accordance with the position of the wiper arm 84 on the slide wire 76. The greater the signal from the converter 22 to the linearizer multiplier 24, the more clockwise the wiper arm 84 will be on the slide wire 76 and the greater the output voltage across the conductors 92 and 94.

Thus linearizing and functional multiplication is accomplished in the linearizer multiplier 24 to provide an output signal which represents the mass of coal passing the C-frame structure 12 and conveyor speed-sensing structure 18 on the conveyor belt 14.

The signal representing the mass of coal passing the C-frame structure 12 and speed-sensing structure 18 is fed to a ton-rate indicator 28 through the calibrating network 26 to provide a visual display of the ton rate of coal passing the predetermined point. The indication is directly in a ton-rate parameter due to the passing of the signal representing the mass of coal on the conveyor belt through the calibrating network 26. Calibrating networks to provide any desired parameter indication are well known and will not, therefore, be disclosed in detail herein.

The signal representing the mass of coal passing the predetermined point from the linearizer multiplier 24 is also converted from an analogue signal to a digital signal in the analogue-to-digital converter 30. The digital signal is then counted in the counter 32 and a total ton quantity of coal passing the predetermined point at the C-frame 12 and conveyor speed sensing structure 18 is registered in the register 34. Again, scaling or calibrating networks to provide the registered output in the ton parameter as well as analogue-to-digital converters, counters and registers are well known and will not be considered in further detail herein.

The mass computation system thus disclosed has an accuracy of plus or minus five-tenths of a percent in measuring coal passing a predetermined point on a conveyor belt in a major electrical utility and has good repeatability. Further, it will be noted that the belt speed may be variable, and the coal on the belt need not have any predetermined shape. Also, the mass of material other than coal may be determined without recalibrating the mass computation system 10 so long as the material has a density that is weight per unit volume substantially the same as coal.

We claim:

1. Mass computation structure comprising means for providing a signal proportional to the density of material passing a predetermined point on a moving conveyor belt, means for providing a signal proportional to the speed of the belt passing the predetermined point and a linearized slide-wire multiplier connected to the means for providing a signal proportional to the density of the material passing the predetermined point and the means for providing a signal proportional to the speed of the belt for combining the signals proportional to the density of the material and speed of the belt to provide a signal proportional to the mass of material passing the predetermined point including an elongated resistance element connected at the opposite ends thereof to receive the signal proportional to the density of the material passing the predetermined point, motor means, means for positioning a wiper arm on the elongated resistance element in accordance with the rotation of the motor, means for rotating the motor in response to and an amount representing the signal proportional to the speed of the belt passing the predetermined point, means for taking an output from one end of the elongated resistance element and from the wiper arm and a series string of a plurality of separate variable resistance elements connected in parallel with the elongated resistance element for linearizing the slide-wire multiplier and wherein the means for providing a signal proportional to the density of the material passing a predetermined point on the moving conveyor belt comprises a radioactive source positioned on one side of the conveyor belt and radioactivity sensing means responsive to radioactive radiation to provide and electric signal proportional thereto positioned on the opposite side of the conveyor belt whereby radiation from the source of radioactive radiation passes through the material on the conveyor belt and is sensed by the radioactivity sensing means to produce a signal proportional to the density of material moving on the conveyor belt.

2. Structure as set forth in claim 1 wherein the means for providing a signal proportional to the speed of the conveyor belt passing the predetermined point comprises means for producing a digital signal proportional to the speed of movement of the belt including a pivot mounting, a lever centrally pivoted to the pivot mounting, a wheel engaged with the conveyor belt rotatably mounted on one end of the lever, a weight on the other end of the lever for holding the wheel in engagement with the conveyor belt with a predetermined force, a toothed disc secured to the wheel for rotation therewith, an electromagnetic pickup device secured to the lever immediately adjacent the periphery of the disc operable to produce a pulse of electric energy each time a tooth of the disc passes the electromagnetic pickup device, and a digital-to-analog converter connected to the electromagnetic pickup device for receiving the digital signals produced thereby and converting the digital signals into an analog signal usable in the linearized multiplier.

3. Structure as set forth in claim 2 further including temperature control means connected to the means responsive to radioactive radiation for compensating for effect of temperature on the means responsive to radioactive radiation.

4. Structure as set forth in claim 2 wherein the output from the linearized multiplier is analog and further including an analog-to-digital converter connected to the linearized multiplier for providing a digital output signal proportional to the analog signal output of the linearized multiplier, a counter connected to the analog-to-digital converter for counting the digital signal output from the analog-to-digital converter and a register connected to the counter for registering the number of digital signals counted by the counter.

5. Structure as set forth in claim 2 wherein the output from the linearized multiplier is analog and further including a rate indicator for receiving the analog output of the linearized multiplier and providing an indication of the rate of material passing the predetermined point on the conveyor belt and a calibrating network positioned between the linearized multiplier and the rate indicator for calibrating the rate indicator to read directly in predetermined units of material passing the predetermined point.